United States Patent
Ghassempour Aghamolki et al.

(10) Patent No.: US 12,418,171 B2
(45) Date of Patent: Sep. 16, 2025

(54) NETWORK PROTECTOR WITH A COMMUNICATIONS INTERFACE

(71) Applicant: Eaton Intelligent Power Limited, Dublin (IE)

(72) Inventors: Hossein Ghassempour Aghamolki, Edina, MN (US); Swaroop Gajare, Cranberry Township, PA (US); Amal Thomas, Changanassery (IN); Amit Govind Kolge, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 376 days.

(21) Appl. No.: 17/960,264

(22) Filed: Oct. 5, 2022

(65) Prior Publication Data
US 2023/0138879 A1    May 4, 2023

Related U.S. Application Data (60) Provisional application No. 63/272,932, filed on Oct. 28, 2021.

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC ........ H02H 1/0007; H02H 3/06; H02H 3/081; H02H 3/18; H02H 7/22; H02H 7/261
(Continued)

(56) References Cited

U.S. PATENT DOCUMENTS 5,701,226 A    12/1997  Gelbien et al.
6,160,690 A *  12/2000  Matsumoto .......... H02H 1/0061
                                             361/64
(Continued)

FOREIGN PATENT DOCUMENTS

CN      104836455 A    8/2015
JP      4519337 B2     5/2010
(Continued)

OTHER PUBLICATIONS

Avinash Aithal et al. "Performance of an electrical distribution network with Soft Open Point during a grid side AC fault" Applied Energy. vol. 227. pp. 262-272. ISSN 0306-2619. Accessible at: https://www.sciencedirect.com/science/article/pii/S0306261917311686 (2018).
(Continued)

*Primary Examiner* — Kevin J Comber
(74) *Attorney, Agent, or Firm* — DiBerardino McGovern IP Group LLC (57) ABSTRACT

A network protector includes: a first resettable switching apparatus configured to control an electrical connection between a distribution transformer and a first electrical feeder of a secondary electrical distribution network; a first communications interface; and a first controller configured to: determine a direction of power flow in the first electrical feeder; cause the first communications interface to provide a first indication of the direction of power flow in the first electrical feeder to a second network protector; and receive a second indication from the second network protector. The second indication includes an indication of the direction of power flow in a second electrical feeder of the secondary electrical distribution network.

20 Claims, 8 Drawing Sheets

(58) Field of Classification Search
USPC .......................................................... 361/62
See application file for complete search history.

(56) References Cited

U.S. PATENT DOCUMENTS

| | | | |
|---|---|---|---|
| 6,504,693 B1* | 1/2003 | Moffat | H02H 3/286 |
| | | | 361/76 |
| 6,671,151 B2 | 12/2003 | Smith et al. | |
| 6,816,757 B1* | 11/2004 | De La Ree | G05B 9/02 |
| | | | 700/286 |
| 10,096,991 B2* | 10/2018 | Smith | H02H 3/26 |
| 2006/0165023 A1 | 7/2006 | Faulkner et al. | |
| 2007/0086133 A1* | 4/2007 | Loucks | H02H 7/261 |
| | | | 361/84 |
| 2015/0124358 A1 | 5/2015 | Hulse | |
| 2017/0331274 A1 | 11/2017 | Akke | |
| 2019/0027924 A1 | 1/2019 | O'Regan et al. | |
| 2020/0044436 A1* | 2/2020 | Alibert | G01R 19/16547 |

FOREIGN PATENT DOCUMENTS

| | | |
|---|---|---|
| JP | 2014017947 A | 1/2014 |
| JP | 2014023303 A | 2/2014 |

OTHER PUBLICATIONS

N. Vineeth et al. "High Impedance Fault detection in Low Voltage Distribution Systems Using Wavelet and Harmonic Fault Indices" 2020 IEEE International Conference on Power Electronics. Smart Grid and Renewable Energy (PESGRE2020). Cochin, India. pp. 1-6. (2020).

Nigel Ramon Jordan. "Integration of network protector relays on downtown distribution networks with penetration of renewable energy." LSU Master's Theses. 2647. 101 total pages. (2014).

P. Mohammadi et al. "Challenges of PV Integration in Low-Voltage Secondary Networks," in IEEE Transactions on Power Delivery. vol. 32, No. 1. pp. 525-535. doi: 10.1109/TPWRD.2016.2556692. (Feb. 2017).

T.E. McDermott et al. "Relaying for Distribution and Microgrids Evolving from Radial to Bidirectional Power Flow." PNNL-29145. 90 total pages. (Sep. 2019).

Temitayo O. Olowu, et al. "Future Challenges and Mitigation Methods for High Photovoltaic Penetration: A Survey." Energies. 1782. doi:10.3390/en11071782. 32 total pages. (2018).

Wanyu Cao et al. "Operating principle of Soft Open Points for electrical distribution network operation" Applied Energy. vol. 164. ISSN 0306-2619. Accessible at: https://www.sciencedirect.com/science/article/pii/S0306261915015718. pp 245-257. (2016).

* cited by examiner

NETWORK PROTECTOR WITH A COMMUNICATIONS INTERFACE

CROSS-REFERENCE TO RELATED APPLICATION

This application claims the benefit of U.S. Provisional Application No. 63/272,932, filed on Oct. 28, 2021 and titled NETWORK PROTECTOR WITH A COMMUNICATIONS INTERFACE, which is incorporated herein by reference in its entirety.

TECHNICAL FIELD

This disclosure relates to a network protector with a communications interface. The communications interface allows peer-to-peer communications with other network protectors.

BACKGROUND

A network protector includes a resettable switching apparatus and may be electrically connected to a feeder in a distribution system to control an electrical connection between a load and the feeder.

SUMMARY

In one aspect, a network protector includes: a first resettable switching apparatus configured to control an electrical connection between a distribution transformer and a first electrical feeder of a secondary electrical distribution network; a first communications interface; and a first controller configured to: determine a direction of power flow in the first electrical feeder; cause the first communications interface to provide a first indication of the direction of power flow in the first electrical feeder to a second network protector; and receive a second indication from the second network protector. The second indication includes an indication of the direction of power flow in a second electrical feeder of the secondary electrical distribution network.

Implementations may include one or more of the following features.

The first electrical feeder and the second electrical feeder may be electrically connected in parallel to an alternating current (AC) power source, and the first controller may be further configured to: determine whether the direction of power flow in the first electrical feeder is forward or reverse. Forward power flow is away from the power source and reverse power flow is toward the power source. The first controller may be further configured to: not open the first resettable switching apparatus if the power flow in the first feeder is reverse and the power flow in the second feeder is reverse; and open the first resettable switching apparatus if the power flow in the first feeder is reverse and the power flow in the second feeder is forward. The first controller may be configured to not open the first resettable switching apparatus if the power flow in the first feeder is reverse and the power flow in the second feeder is reverse.

The first resettable switching apparatus may be a circuit breaker or a vacuum interrupter.

In another aspect, a system includes: a first network protector configured to control an electrical connection between a first distribution transformer and a first electrical feeder of a secondary electrical distribution network, the first network protector including: a first communications interface; and a first resettable switching apparatus. The system also includes: a second network protector configured to control an electrical connection between second distribution transformer and a second electrical feeder of the secondary electrical distribution network, the second network protector including: a second communications interface; and a second resettable switching apparatus. The first communications interface is configured to: provide information related to a direction of power flow in the first electrical feeder to the second communications interface, and to receive information related to a direction of power flow in the second electrical feeder from the second communications interface. The second communications interface is configured to: provide information related to a direction of power flow in the second electrical feeder to the first communications interface, and to receive information related to a direction of power flow in the first electrical feeder from the first communications interface.

Implementations may include one or more of the following features.

The system also may include a vault, and the first network protector and the second network protector may be enclosed in the vault.

The first electrical feeder and the second electrical feeder may be electrically connected in parallel to a power source, and the first controller may be further configured to: determine whether the direction of power flow in the first electrical feeder is forward or reverse. Forward power flow is away from the power source and reverse power flow is toward the power source. The first controller may be further configured to: not open the first resettable switching apparatus if the power flow in the first feeder is reverse and the power flow in the second feeder is reverse; and open the first resettable switching apparatus if the power flow in the first feeder is reverse and the power flow in the second feeder is forward. The first controller may be configured to not open the first resettable switching apparatus if the power flow in the first feeder is reverse and the power flow in the second feeder is reverse at the same time.

The first controller may be further configured to: not open the first resettable switching apparatus if the power flow in the first feeder is reverse and the power flow in the second feeder is reverse; and open the first resettable switching apparatus if the power flow in the first feeder is reverse and the power flow in the second feeder is forward. The second controller may be further configured to: not open the second resettable switching apparatus if the power flow in the second feeder is reverse and the power flow in the first feeder is reverse; and open the second resettable switching apparatus if the power flow in the second feeder is reverse and the power flow in the first feeder is forward. The first electrical feeder and the second electrical feeder may be configured to electrically connect to one or more distributed energy resources.

In another aspect, a method includes: controlling a first network protector to provide a first indication, the first indication being an indication of the direction of power flow in a first electrical feeder of a secondary electrical distribution network; comparing the first indication and a second indication, the second indication being an indication of the direction of power flow in a second electrical feeder of the secondary electrical distribution network; and determining whether to control the first network protector or a second network protector based on the comparison.

Implementations may include one or more of the following features.

Controlling the first network protector may include controlling the first network protector to provide the first indication to the second network protector. Comparing the first indication and the second indication may include comparing the first indication to the second indication at the second network protector. Comparing the first indication and the second indication may include determining whether the direction of power flow is away from a load in the first electrical feeder and away from the load in the second electrical feeder; and, if the direction of power flow is away from the load in the first electrical feeder and away from the load in the second electrical feeder, the method further includes maintaining a resettable switching apparatus in the first network protector in a closed state and maintaining a resettable switching apparatus in the second network protector in a closed state such that the power flow continues in the secondary electrical distribution network. The load may include one or more distributed energy resources (DER), and at least some of the power flow away from the load in the first electrical feeder and in the second electrical feeder is based on electrical power generated by the one or more DERs.

Implementations of any of the techniques described herein may include a system, a network protector, a controller, a method, a process, or executable instructions stored on a machine-readable medium. The details of one or more implementations are set forth in the accompanying drawings and the description below. Other features will be apparent from the description and drawings, and from the claims.

DETAILED DESCRIPTION

Figure 1:
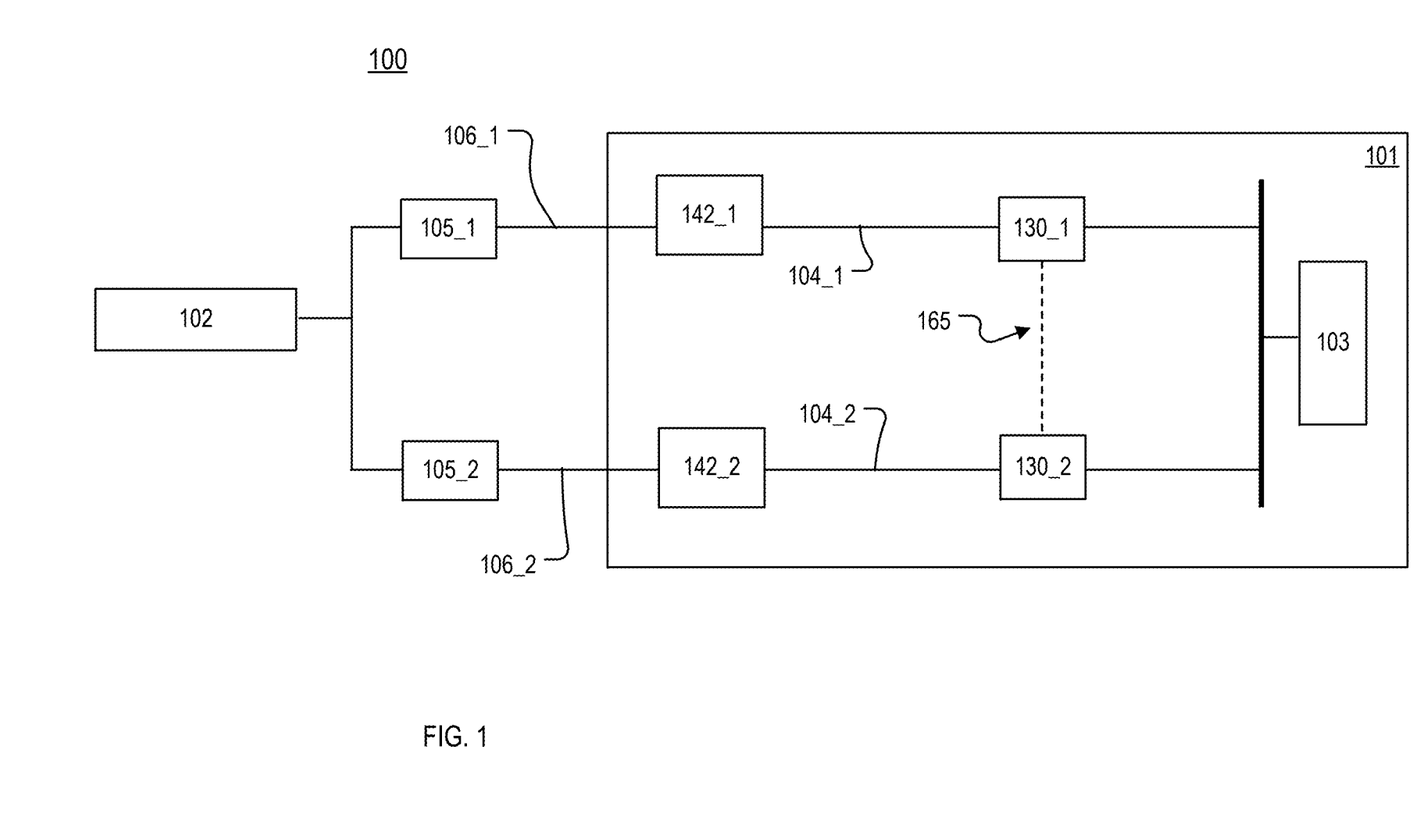
FIG. 1 is a block diagram of an example of an electrical power system.

FIG. 1 is a block diagram of an example of an electrical power system 100. The power system 100 may be a single-phase power system or a multi-phase (for example, three-phase) power system. A single phase is shown in FIG. 1 for simplicity. The electrical power system 100 includes a secondary distribution network 101 that includes network protectors 130_1 and 130_2 coupled to respective feeders 104_1 and 104_2. The feeders 104_1 and 104_2 are connected to a load or loads 103. The network protectors 130_1 and 130_2 are configured to communicate with each other via a communications path 165.

The secondary distribution network 101 is connected to an alternating (AC) power source 102 through feeders 106_1 and 106_2. The feeders 106_1 and 106_2 transfer AC electrical power from the power source 102 to a primary or source side of respective distribution transformers 142_1 and 142_2. A distribution transformer is a transformer performs a voltage transformation at an end point or node of a distribution grid. In the example of FIG. 1, the distribution transformers 142_1 and 142_2 convert the voltage on the respective feeders 106_1 and 106_2 (which is determined by the source 102) to lower voltages that are suitable for general household, industrial, and/or commercial use. For example, the distribution transformers 142_1 and 142_2 may transform the voltage on the respective feeders 106_1 and 106_2 to a voltage of 1 kV or less. The secondary side of each distribution transformer 142_1, 142_2 is connected to the feeder 104_1, 104_2, respectively, of the secondary distribution network 101. A medium-voltage circuit breaker 105_1 is coupled to the feeder 106_1. A medium-voltage circuit breaker 105_2 is coupled to the feeder 106_2.

The AC power source 102 operates at a fundamental frequency of, for example, 50 or 60 Hertz (Hz). The power source 102 may be, for example, a generator, a power plant, an electrical substation, or a renewable energy source. The power source 102 may be medium-voltage or distribution voltage (for example, between 1 kilovolts (kV) and 35 kV) or high-voltage (for example, 35 kV and greater). Moreover, the power source 102 may receive power from other electrical power sources that are not shown in FIG. 1. For example, the power source 102 may be a medium-voltage substation that receives and transforms high-voltage AC power into medium-voltage AC power that is provided to feeders 106_1 and 106_2.

The network protectors 130_1 and 130_2 control the flow of electrical power to and from the secondary distribution network 101. As discussed in greater detail below, the network protectors 130_1 and 130_2 are configured to communicate information related to the direction of power flow on respective feeders 104_1 and 104_2 via a communications path 165 (shown as a dotted line in FIG. 1). The information related to the direction of power flow is used to determine whether an error condition exists in the system 100 or the distribution network 101. For example, in some implementations, the network protector 130_1 receives an indication of the direction of power flow on the feeder 104_2 from the network protector 130_2 and compares the received indication with an indication of the direction of power flow on the feeder 104_1. If the direction of power flow is the same on both feeders 104_1, 104_2, no error condition exists, the network protector 130_1 remains closed, and power continues to flow in the feeder 104_1. If the power flows in the feeder 104_1 in a different direction than in the feeder 104_2, an error condition exists. When an error condition is determined to exist, the network protector 130_1 and/or the network protector 130_2 opens such that power no longer flows in the feeder 104_1 and/or 104_2.

The configuration the network protectors 130_1 and 130_2 allows the network protectors 130_1 and 130_2 to accept bi-directional power flow (power flow away from or toward the source 102) while also allowing the network protectors 130_1 and 130_2 to protect the load 103 from abnormal conditions. Reverse power flow is power that flows toward the source 102 and forward power flow is power that flows away from the source 102. Bi-directional power flow includes reverse power flow and forward power flow.

Forward power flow is typically present during normal and expected operation of the system 100. Reverse power flow may arise from error conditions or during ordinary and error-free operation. Error conditions include, for example, maintenance conditions and fault conditions. A maintenance condition is a condition that is intentionally caused due to scheduled maintenance or other intentional action that involves opening the medium-voltage circuit breaker 105_1 or the medium-voltage circuit breaker 105_2. A fault condition is an unintentional event that changes the flow of power in the secondary distribution network 101 and/or the system 100. Examples of unintentional events include, for example, phase-to-ground faults, overcurrent conditions, and over-voltage conditions. Unintentional events may be caused by falling objects, ingress of moisture, storms, equipment malfunction, and other unplanned events. The medium-voltage circuit breaker 105_1 and/or the medium-voltage circuit breaker 105_2 open in the presence of a fault condition.

Reverse power flow due to a fault condition does not flow on all of the feeders in the secondary distribution network 101. For example, when the medium-voltage circuit breaker 105_2 is opened (due to a fault or for maintenance), the feeder 104_1 has forward power flow and the feeder 104_2 has reverse power flow.

Reverse power flow that arises from ordinary operation flows on all of the feeders in the network 101. For example, reverse power flow may arise from excess power that is generated by a distributed energy resource (DER) connected to the distribution network 101. A DER is an electricity-producing resource and/or a controllable load. Examples of DERs include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems, and electric water heaters. The loads 103 include one or more DERs and also may include devices and systems that are not DERs. For example, the loads 103 also may include motors, lighting systems, and/or machines.

Under some conditions, the power generated by the DERs exceeds the power demand of the loads 103, and the DERs return electrical power to the secondary distribution network 101. This returned electrical power is reverse power that flows from the loads 103 toward the source 102. Reverse power flow that is caused by excess DER power generation appears on all of the feeders in the secondary distribution network 101 (the feeder 104_1 and the feeder 104_1 in the example of FIG. 1).

Although reverse power flow from error conditions is undesirable, reverse power flow that arises from DER power generation is generally desirable and may be used by other systems within the power system 100. Traditional network protectors are configured with logic that assumes that reverse power flow is an indication of a fault condition, and these traditional network protectors open and disconnect their load based on a detection of reverse power flow in the feeder associated with the network protector. Thus, such traditional network protectors are unable to return excess power generated by a DER to the grid because the traditional network protectors always open or trip in the presence of reverse power flow.

On the other hand, the network protector 130_1 and the network protector 130_2 distinguish between normal operation (including reverse power flow caused by excess DER power generation) and abnormal conditions using information from one or more other network protectors. The network protectors 130_1 and 130_2 are not configured to assume that reverse power flow is always caused by an error condition. Instead, the network protectors 130_1 and 130_2 allow reverse power flow so long as no error condition exists.

The network protectors 130_1 and 130_2 have fewer tripping (or opening events) than a traditionally configured network protector and, as a result, may have a longer lifetime and may cause fewer service interruptions than a traditionally configured network protector. Additionally, the network protectors 130_1 and 130_2 encourage efficient use of generated energy. Moreover, the network protectors 130_1 and 130_2 may be used in implementations in which the secondary distribution network 101 has a relatively high penetration of DER power generation, for example, a 90% or greater penetration. DER penetration is the ratio of nominal capacity of DER power generation to the nominal load of the feeder to which the DERs are connected. The likelihood of reverse power arising from DER power generation occurring increases with DER penetration.

Before discussing the network protectors 130_1 and 130_2 in greater detail, an overview of the secondary distribution network 101 is provided.

The secondary distribution network 101 is a low-voltage network (for example, a network that distributes electricity having a voltage of 1 kV or less). The secondary distribution network 101 may be a spot network or an area network. In a spot network, two or more feeders are connected in parallel to a common bus to provide power to a specific location, building, or spot. A grid or area network includes redundant feeders. Regardless of the configuration of the low-voltage network, the network protectors 130_1 and 130_2 improve the overall performance of the low-voltage network. For example, reverse power caused by DER generation exceeding the demand causes a network protector with a traditional configuration to open, even if there is no fault condition. In a spot network that employs traditional network protectors, any reverse power causes the network protectors to open, which results in a service outage for the load. In an area or grid network that employs only traditional network protectors, the presence of reverse power may cause fewer than all network protectors to open, however, reliability is reduced when even some of the network protectors open. Thus, the network protectors 130_1 and 130_2, which do not assume that reverse power flow is caused by a fault condition, improve the performance of spot and area networks.

Figure 2:
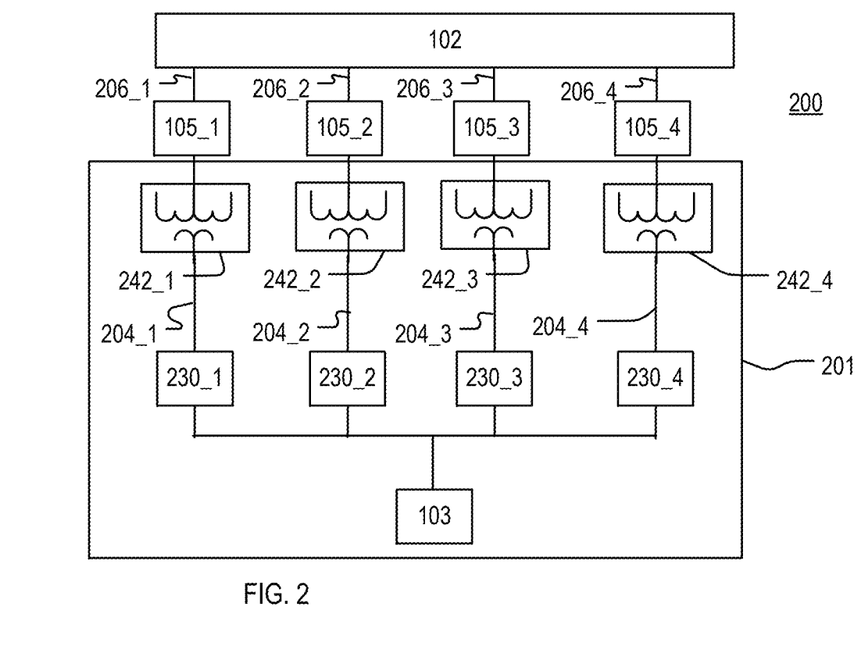
FIG. 2 is a block diagram of an example of a spot network.

FIG. 2 is a block diagram of an electrical power system 200 that includes a spot network 201. The spot network 201 includes four parallel low-voltage feeders 204_1, 204_2, 204_3, 204_4 that are all connected to a spot, which is the loads 103 in the example of FIG. 2. The loads 103 may be, for example, a variety of electrical loads that are all within one large building or location, such as an airport terminal, a hospital, or an apartment building. The spot network 201 includes one or more DERs.

The spot network 201 receives electrical power from four medium-voltage feeders 206_1, 206_2, 206_3, 206_4 that are fed by the AC power source 102. The feeders 206_1, 206_2, 206_3, 206_4 include respective circuit breakers 105_1, 105_2, 105_3, and 105_4 that open in the presence of an abnormal condition, such as a fault (for example, an over-voltage or overcurrent condition) or scheduled maintenance.

Each medium-voltage feeder 206_1, 206_2, 203_3, 206_4 is electrically connected to a primary side of a respective distribution transformer 242_1, 242_3, 242_3, 242_4. The voltage at on each feeder 206_1, 206_2, 206_3, 206_4 and at the primary side of each respective distribution transformer 242_1, 242_3, 242_3, 242_4 is determined by the voltage of the source 102. The distribution transformers 242_1, 242_3, 242_3, 242_4 step down (reduce) the voltage from the source 102 such that the voltage at a secondary side of each transformer is lower than the voltage at the primary side. The voltage at the primary side of the distribution transformers may be, for example, between 1 kV and 35 kV, and the voltage at the secondary side of the distribution transformers may be, for example, 240 V, 480 V, 600 V, or another voltage below 1 kV.

The secondary side of each distribution transformer 242_1, 242_3, 242_3, 242_4 is electrically connected to a respective low-voltage feeder 204_1, 204_2, 204_3, 204_4. Respective switch devices 230_1, 230_2, 230_3, 230_4 control the electrical connection between the loads 103 and each low-voltage feeder 204_1, 204_2, 204_3, 204_4. Each switch device 230_1, 230_2, 230_3, 230_4 may be, for example, a network protector. Each switch device 230_1, 230_2, 230_3, 230_4 is configured to communicate with at least one other of the switch devices 230_1, 230_2, 230_3, 230_4. Each switch devices 230_1, 230_2, 230_3, 230_4 is configured to communicate information related to the direction of power flow on the respective low-voltage feeder 204_1, 204_2, 204_3, 204_4.

Figure 3:
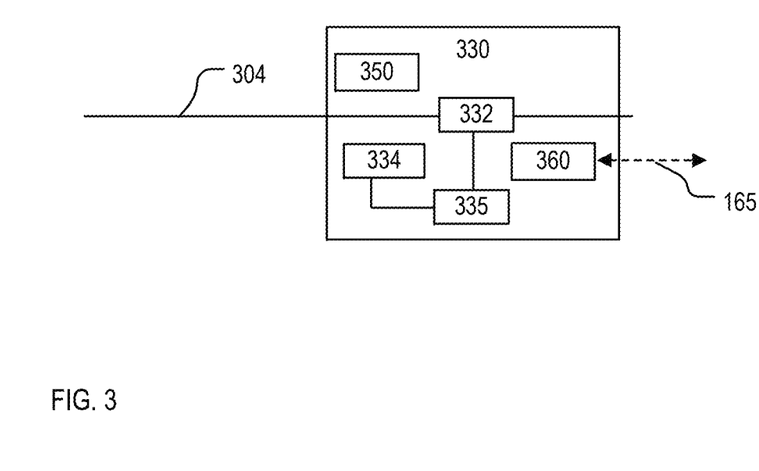
FIG. 3 is a block diagram of an example of a network protector.

FIG. 3 is a block diagram of a network protector 330. The network protector 330 may be used as the network protector 130_1, 130_2, 230_1, 230_2, 230_3, or 230_4. The network protector 330 includes a resettable switching apparatus 332, a sensing apparatus 334, and a switch control mechanism 335. The network protector 330 also includes a communications interface 360 that sends and receives data, information, and/or commands over a communications path 365.

The sensing apparatus 334 monitors the electrical power on a low-voltage feeder 304 and the switch control mechanism 335 operates the resettable switching apparatus 332. The switch control mechanism 335 may be, for example, a relay. The network protector 330 also includes a controller 350. The controller 350 may be an electronic controller, such as, for example, a microcontroller. The controller 350 analyzes data collected by the sensing apparatus 334 and provides commands to the switch control mechanism 335 such that the controller 350 controls the state of the resettable switching apparatus 332. The switch control mechanism 335 may be coupled to the controller 350 or implemented as part of the controller 350.

The resettable switching apparatus 332 is any type of switch that is capable of opening and closing the feeder 304. For example, the resettable switching apparatus 332 may be an air circuit breaker. An air circuit breaker includes two electrical contacts that operate in air at atmospheric pressure. When the electrical contacts are joined, current can flow in the feeder 304. When the electrical contacts are separated, current cannot flow in the feeder 304. The resettable switching apparatus 332 is configured for repeated operation. For example, after the resettable switching apparatus 332 opens the feeder 304 to stop or prevent current flow, the resettable switching apparatus 332 is able to close the feeder 304 such that current flow in the feeder 304 resumes. The resettable switching apparatus 332 also may include additional components and systems such as actuators, motors, springs, levers, and/or driving electronics that facilitate the operation of the switching apparatus 332.

The communications interface 360 is any type of interface that is capable of receiving and sending data, information, and/or commands over the communications path 365. For example, the communications interface 360 may be a network interface (such as an Ethernet interface), a Bluetooth interface, a serial interface (for example, RS-232 or RS-485), or an International Electrotechnical Commission's (IEC) 61850 interface. The communications path 365 may be wired or wireless. The communications path 365 may be configured to transmit data, information, and commands using an industrial protocol such as, for example, the common industrial protocol (CIP), Modbus, HART protocol, FOUNDATION fieldbus, or Ethernet Powerlink.

The communications interface 360 is coupled to the controller 350 such that the controller 350 can cause data, information, and/or commands to be sent from the network controller 330 and received by the network controller 330.

FIGS. 1, 2, and 3 are provided as examples, and other configurations are possible. For example, the secondary distribution network 201 may have fewer or more than four parallel low-voltage feeders.

Figure 4:
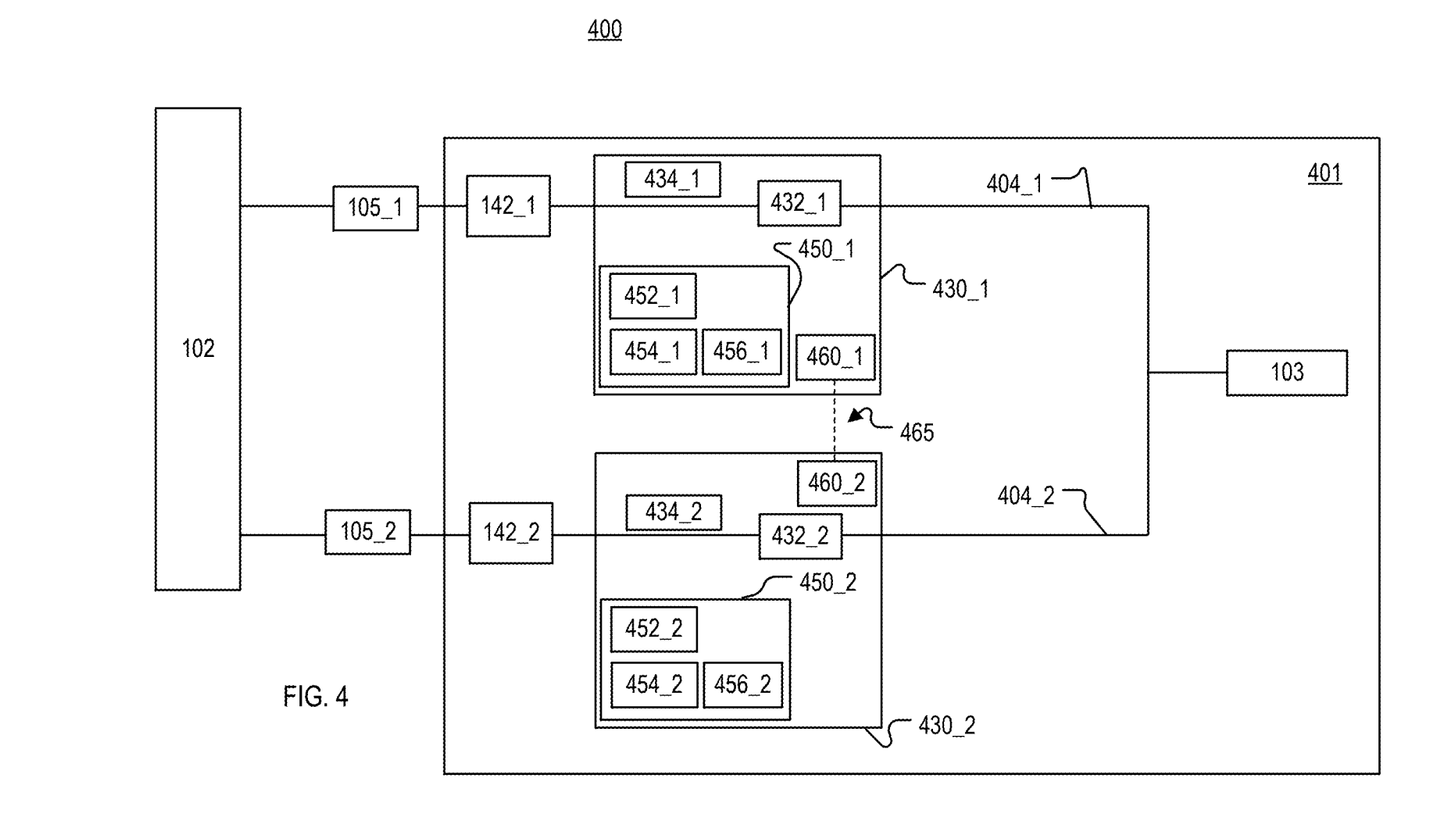
FIG. 4 is a block diagram of another example of an electrical power system.

FIG. 4 is a block diagram of a system 400 that includes a secondary distribution network 401. The distribution network 401 is a low-voltage secondary distribution network and includes a plurality of feeders. The distribution network 401 may be a spot network. In the example of FIG. 4, two feeders 404_1 and 404_2 are shown. A network protector 430_1 is coupled to the feeder 404_1 and a network protector 430_2 is coupled to the feeder 404_2. A single phase is shown in FIG. 4. However, the network protectors 430_1 and 430_2 may be multi-phase (for example, three-phase) network protectors.

The network protector 430_1 includes a resettable switching apparatus 432_1, a sensing apparatus 434_1, a controller 450_1, and a communications interface 460_1. The network protector 430_2 includes a resettable switching apparatus 432_2, a sensing apparatus 434_2, a controller 450_2, and a communications interface 460_2. The sensing apparatus 434_2 monitors the feeder 404_2. The sensing apparatus 434_2 provides data related to the direction of power flow on the feeder 404_2 to the controller 450_2. Data, information, and/or commands are sent through the communications interface 460_1 to the communications interface 460_2. Data, information, and/or commands are sent through the communications interface 460_2 to the communications interface 460_1. Thus, the network protectors 430_1 and 430_2 communicate with each other through the communications interfaces 460_1 and 460_2.

The network protector 430_1 is discussed in more detail. The resettable switching apparatus 432_1 is any type of switch that is capable of opening and closing the feeder 404_1. For example, the resettable switching apparatus 432_1 may be an air circuit breaker. The resettable switching apparatus 432_1 also may include additional components and systems such as actuators, motors, springs, levers, and/or driving electronics that facilitate the operation of the switching apparatus 432_2.

The sensing apparatus 434_1 includes one or more detectors or sensors, each of which is configured to sense one or more properties of the power that flows in the feeder 404_1. The sensing apparatus 434_1 may include any type of current sensor, such as, for example, a current transformer (CT) or a Rogowski coil. In some implementations, a conductor-mounted power flow sensor with a high sampling rate, such as the GridAdvisor Series II smart sensor, available from the Eaton Corporation of Cleveland, Ohio, may be used. Alternately or additionally, the sensing apparatus 434_1 may include one or more voltage sensors and/or one or more power sensors. The sensing apparatus 434_1 may include other related devices, such as timers or other devices that measure the passage of time.

The sensing apparatus 434_1 produces data related to the direction of power flow on the feeder 404_1 and/or data from which the direction of power flow may be derived. For example, in some implementations, the sensing apparatus 434_1 produces a binary indicator that has a first value when current flows toward the loads 103 and second value when current flows toward the source 102. In another example, the sensing apparatus 434_1 produces data related to a measured quantity, such as a numerical value of measured real power on the feeder 404_1, and the direction of power flow is derived from the measured quantity. In another example, when a CT is part of the sensing apparatus 434_1, the direction of current is determined based on the polarity.

The controller 450_1 is an electronic controller that includes an electronic processing module 452_1, an electronic storage 454_1, and an input/output (I/O) interface 456_1. The electronic processing module 452_1 includes one or more electronic processors, each of which may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 454_1 may be any type of electronic memory that is capable of storing data and instructions in the form of computer programs or software, and the electronic storage 454_1 may include volatile and/or nonvolatile components. The electronic storage 454_1 and the processing module 452_1 are coupled such that the processing module 452_1 can access or read data from and write data to the electronic storage 454_1.

The electronic storage 454_1 stores executable instructions, for example, as a computer program, logic, or software, that cause the processing module 452_1 to perform various operations. The electronic storage 454_1 stores instructions that cause the processing module 452_1 to send information, data, and/or commands to an external device through the communications interface 460_1 and instructions that cause the processing module 452_1 to process information, data, and/or commands that are received through the communications interface 460_1 from an external device. For example, the electronic storage 454_1 stores executable instructions that cause the processing module 452_1 to perform the process 600 of FIG. 6. To provide another example, the electronic storage 454_1 may store instructions that cause readings from the sensing apparatus 434_1 to be stored on the electronic storage 454_1. The instructions also may include instructions that compare the readings obtained by the sensing apparatus 434_1 to one or more threshold values or specifications stored on the electronic storage 454_1.

Furthermore, the electronic storage 454_1 may store instructions that, when executed, cause the electronic processing module 452_1 to generate a command signal that causes the resettable switching apparatus 432_1 to change state. For example, the electronic processing module 452_1 send a switch control mechanism (such as the relay 135_1 shown in FIG. 1B) a command signal that causes the resettable switching apparatus 432_1 to open or close, or the electronic processing module 452_1 may send a command signal directly to the resettable switching apparatus 432_1.

Furthermore, the electronic storage 454_1 may include instructions that implement techniques for filtering and/or preparing the data produced by the sensing apparatus 434_1. For example, the electronic storage 454_1 may include instructions that implement an analog-to-digital (A/D) converter that digitizes analog data from the sensing apparatus 434_1.

The I/O interface 456_1 may be any interface that allows a human operator and/or an autonomous process to interact with the controller 450_1. The I/O interface 456_1 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, an Ethernet interface. The I/O interface 456_1 also may allow communication without physical contact through, for example, an IEEE 802.11, Bluetooth, or a near-field communication (NFC) connection. The controller 450_1 may be, for example, operated, configured, modified, or updated through the I/O interface 456_1.

The I/O interface 456_1 also may allow the controller 450_1 to communicate with systems external to and remote from the network protector 430_1. For example, the I/O interface 456_1 may include a communications interface that allows communication between the controller 450_1 and a remote station (not shown), or between the controller 450_1 and a separate electrical apparatus in the power system 100 (FIG. 1A) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the controller 450_1 without making physical contact with the network protector 430_1 or the controller 450_1. For example, the remote station may be a computer-based work station, a smart phone, tablet, or a laptop computer that connects to the controller 450_1 via a services protocol, or a remote control that connects to the controller 450_1 via a radio-frequency signal. The controller 450_1 may communicate information such as whether or not an error condition exist to the remote station through the I/O interface 456_1.

The controller 450_1 is coupled to the communications interface 460_1. The communications interface 460_1 may be any type of interface sends and receives data, commands, and/or information through a communications path 465. The communications path 465 may be wired or wireless and may send data, information, and commands using a specific communications protocol such as, for example, an industrial protocol, a services protocol, or an Internet protocol.

The communications interface 460_1 may be a type of network interface, such as, for example, an Ethernet interface. In another example, the communications interface 460_1 is an IEC 61850 interface. The communications interface 460_1 also may allow communication without physical contact through, for example, an IEEE 802.11, Bluetooth, or a near-field communication (NFC) connection. In some implementations, the communication interface 460_1 is implemented as part of the I/O interface 456_1.

The network protector 430_2 is configured in the same manner. In the example of FIG. 4, the network protector 430_2 monitors the feeder 404_2. The network protector 430_2 and the controller 450_2 provide an indication of the direction of power flow on the feeder 404_2 through the communications interface 460_2 and may receive an indication of the direction of power flow on the feeder 404_1 from the network protector 430_1.

Other implementations are possible. For example, the low-voltage distribution network 401 may include more than two low-voltage feeders and more than two network protectors. In these examples, each network protector 430_1 and 430_2 is configured to communicate with more than one other network protector.

Moreover, in the example shown in FIG. 4, each network protector 430_1 and 430_2 includes a respective controller 450_1 and 450_2. However, in other implementations, one controller may be used by the network protectors 430_1 and 430_2. In these implementations, the controller may be implemented separately from the network protector 430_1 and/or the network protector 430_2. For example, the controller 450_1 may be configured to control the components of the network protector 430_1 and the components of the network protector 430_2 and to access data from the sensing apparatus 434_1 and the sensing apparatus 434_2.

In some implementations, the network protectors 430_1 and 430_2 do not include an integrated controller and instead communicate with a controller that is separate from the network protectors 430_1 and 430_2. The separate controller controls the components of both network protectors 430_1, 430_2 and accesses the data from the sensing apparatuses 434_1, 434_2. In these implementations, the separate controller may be configured in the same manner as the controller 450_1 or 450_2.

Figure 5:
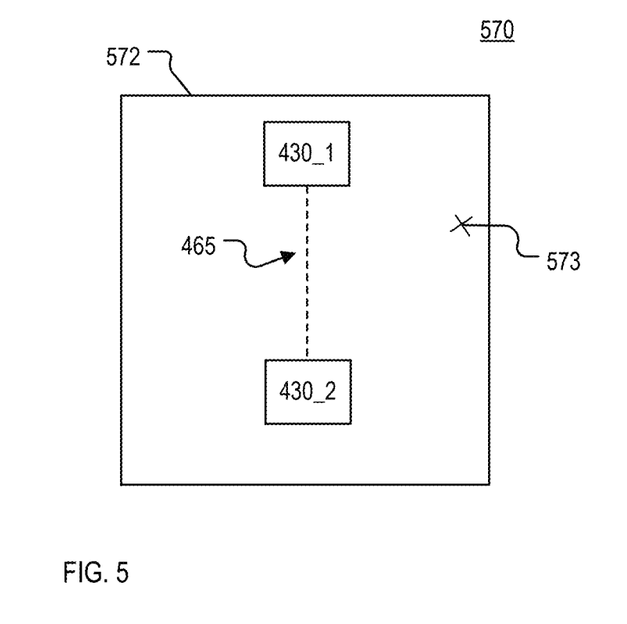
FIG. 5 is a side block diagram of a network protector system.

Furthermore, in some implementations, the network protectors 430_1 and 430_2 are enclosed within or otherwise held in a common unit, such as shown in FIG. 5.

FIG. 5 is a side block diagram of a network protector system 570. The network protector system 570 includes a housing 572 that encloses the network protectors 430_1 and 430_2. The housing 572 is a three-dimensional body that defines an enclosed or partially enclosed interior space 573. The housing 572 may be, for example, a cabinet or a vault. The housing 572 may be configured for above-ground or underground use. The housing 572 may be made of any solid, durable material. For example, the housing 572 may be made of aluminum, steel, or a ruggedized polymer material. The housing 572 is sized to accommodate the network protectors 430_1 and 430_2, and the communications path 465. The length of the communications path 465 may be, for example, about 1 to 2 meters.

The housing 572 also may include other components that are not shown in FIG. 5. For example, the housing 572 may include bushings to accommodate the feeders 404_1 and 404_2.

Figure 6:
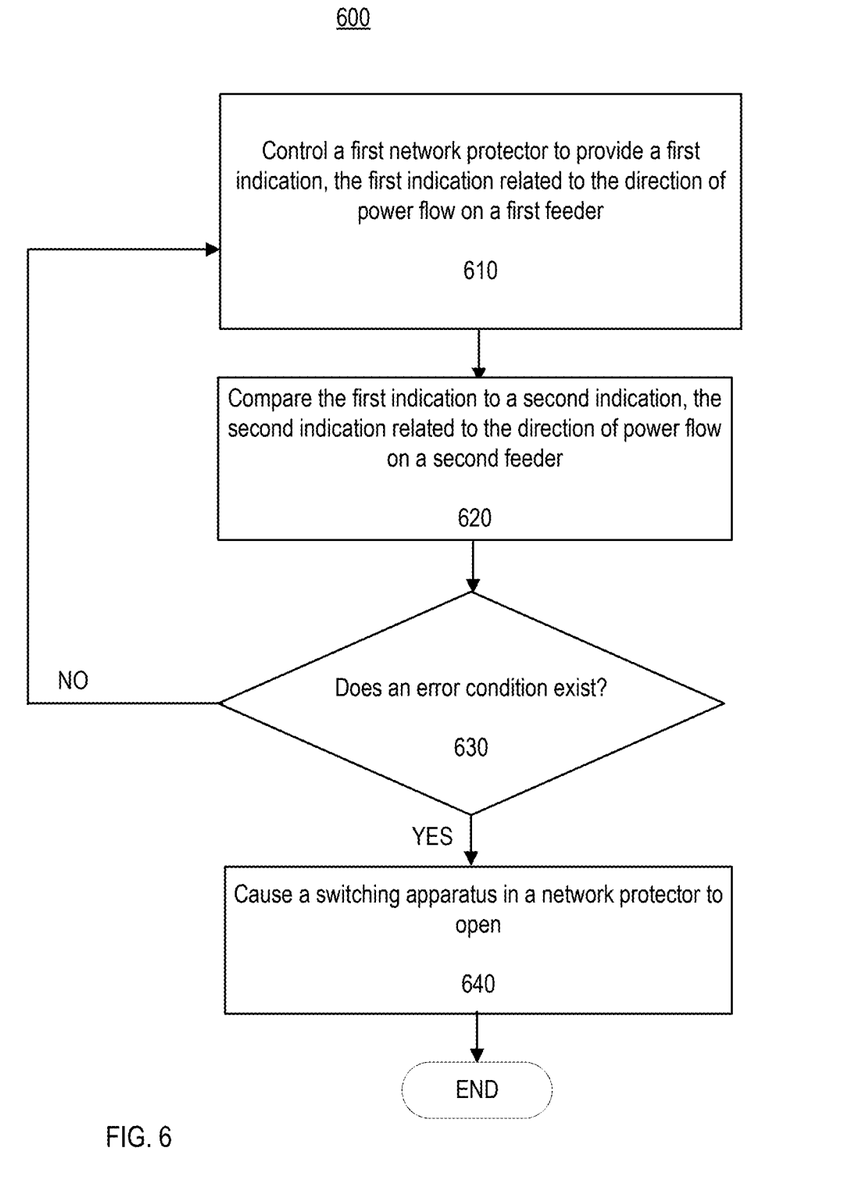
FIG. 6 is a flow chart of an example of a process of operating a network protector.

FIG. 6 is a flow chart of a process 600. The process 600 is an example of a process of operating a network protector. The process 600 may be performed by the controller 450_1, the controller 450_2, or by a separate controller that is coupled to the network protector 430_1 and the network protector 430_2. The process 600 is discussed with respect to the controller 450_1.

The controller 450_1 obtains an indication of the direction of power flow on the feeder 404_2 (610). The controller 450_1 may obtain the indication of the direction of power flow on the feeder 404_2 by producing a command signal and transmitting the command signal over the communications path 465 to the network protector 430_2. The controller 450_2 receives the command signal and provides an indication of the direction of power flow on the feeder 404_2 to the network protector 430_1 via the communication path 465 in response. In some implementations, the network protector 430_2 provides the indication of direction of power flow on the feeder 404_2 to the network protector 430_1 on a regular basis and without being commanded to do so.

The indication of the direction of power flow is based on data from the sensing apparatus 434_2. The indication of the direction of power flow may be, for example, a binary value, a symbol, or a numerical value that represents a measured electrical quantity. For example, in implementations that use a binary value to indicate the direction, a value of 1 may indicate forward power flow and a value of 0 may indicate reverse power flow. In another example, in implementations in which the sensing apparatus 434_2 produces a numerical value that represents a measured electrical quantity (such as real power), the indication of the direction of power flow is derived from the measured data. For example, a value of real power that is less than zero indicates reverse power flow and a value of real power that is greater than zero indicates forward power flow. In this example, the indication of the direction of power flow on the feeder 404_2 is referred to as the first indication of power flow.

The controller 450_1 compares the first indication from the network protector 430_2 to an indication of the direction of power flow on the feeder 404_1 (620). The indication of the direction of power flow on the feeder 404_1 is obtained from the sensing apparatus 434_1 and/or derived from data produced by the sensing apparatus 434_1. In this example, the indication of the direction of power flow on the feeder 404_1 is referred to as the second indication.

The first and second indications may be compared by, for example, subtraction, or in any other suitable manner. The comparison produces an output that indicates whether the first and second indications are the same. If the first and second indications are the same, then the direction of power flow is the same on the feeder 404_1 and the feeder 404_2, and no error condition exists. If the first and second indications are not the same, the direction of power flow on the feeder 404_1 is different than the direction of power flow on the feeder 404_2, and an error condition may exist. In some implementations, the first and second indications are formatted prior to being compared. For example, if the first and second indications are numerical values that represent measured real power, the indications may be converted into binary numbers that indicate the direction of power flow prior to being compared.

If no error condition exists (630), the controller 450_1 does not act on the network protector 430_1 or the network protector 430_2, and power continues to flow in the feeders 404_1 and 404_2. The process 600 returns to (610) or may end.

If an error condition exists (630), the controller 450_1 opens the switching apparatus 432_1 or the switching apparatus 432_2 (640). The controller 450_1 also determines which feeder 404_1 or 404_2 has reverse power flow based on the first and second indications. The controller 450_1 commands the switching apparatus of the network protector that is coupled to the feeder with reverse power flow to open because the reverse power flow exists due to an error condition. For example, if the reverse power is on the feeder 404_1, the controller 450_1 commands the resettable switching apparatus 432_1 to open. The resettable switching apparatus 432_2 remains closed. If the reverse power is on the feeder 404_2, the controller 450_1 commands the resettable switching apparatus 432_2 to open by issuing a command to the network protector 430_2 via the communications path 465. The resettable switching apparatus 432_1 remains closed.

FIGS. 7A-7D and 8A-8D show simulated data for a spot network. The spot network included two low-voltage feeders: feeder 1 and feeder 2, a network protector 36 on feeder 1, and a network protector 37 on feeder 2. The network protectors 36 and 37 were configured for peer-to-peer communication with each other, similar to the network protectors 130_1, 130_2, 330, 430_1, and 430_2 discussed above. Each feeder 1 and 2 was connected to an AC power source through a medium-voltage circuit breaker (MVCB). The spot network was connected to DERs (solar arrays in the simulation). FIGS. 7A-7D relate to a simulation in which the MVCP on feeder 1 was opened due to a fault condition. In FIGS. 7A-7D, the spot network had a 20% photovoltaic (PV) penetration. FIGS. 8A-8D relate to a simulation in which excess energy was produced by the solar arrays. In FIGS. 8A-8D, the spot network had an 80% photovoltaic (PV) penetration.

Figure 7A:
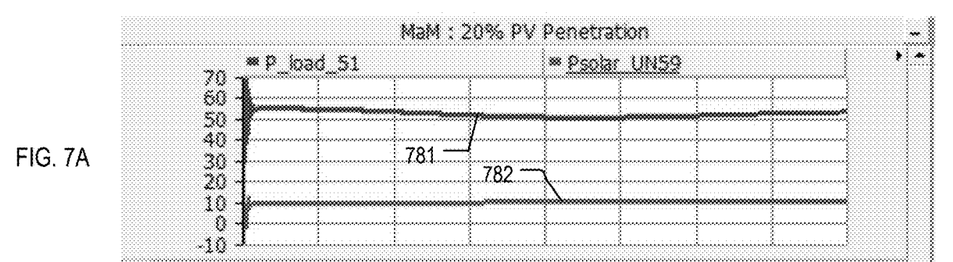
FIGS. 7A-7D show simulated data related to a fault condition.
Figure 7B:
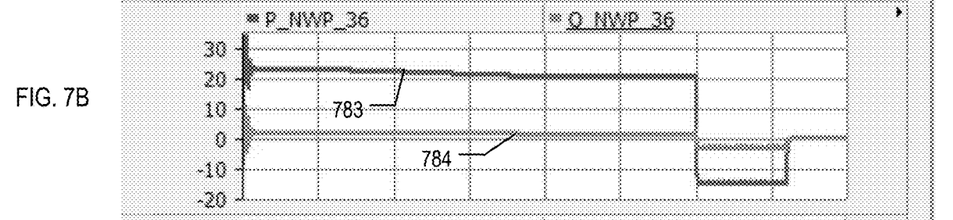
Figure 7C:
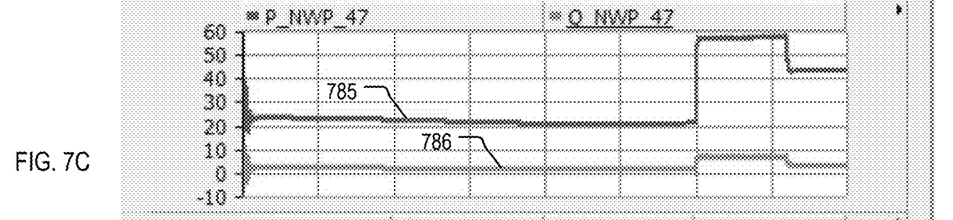
Figure 7D:
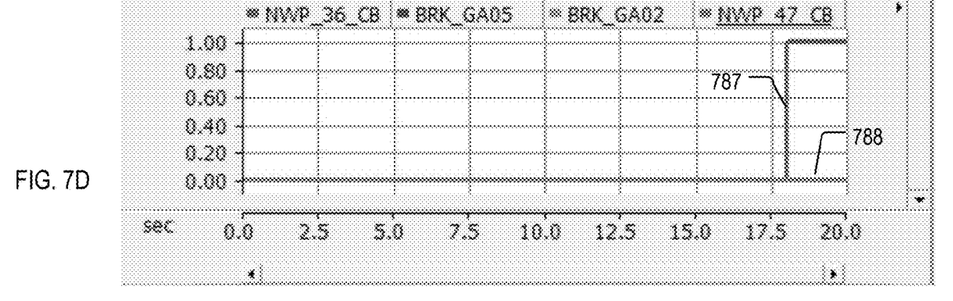

FIG. 7A shows power drawn by the load (781) and power generated by the solar arrays (782) as a function of time in seconds. FIG. 7B shows power through the network protector 36 as a function of time in seconds. In FIG. 7B, real power is labeled 783 and reactive power is labeled 784. FIG. 7C shows power through the network protector 37 as a function of time in seconds. In FIG. 7C, real power is labeled 785 and reactive power is labeled 786. FIG. 7D shows the state of the network protector 36 (787) and the state of the network protector 37 (788) as a function of time. In FIG. 7D, a value of 1 on the y-axis indicated an open state and a value of 0 on the y-axis indicated a closed state. The time scale (x-axis) is the same in FIGS. 7A-7D.

As shown in FIG. 7A, the power generated by the solar arrays (782) did not exceed the power demand of the load (781) during the simulation. At about time t=15 seconds(s), the MVCB on feeder 1 opens due to a fault. The MVCB on feeder 2 remains closed. Reverse power flow occurs on the feeder 1, and the network protector 36 senses reverse power flow, as shown in FIG. 7B. As shown in FIG. 7C, forward power flow continues on feeder 2, and the network protector 37 does not sense reverse power flow. The network protector 36 and/or the network protector 37 perform the process 600. For example, the network protector 37 shares the forward power flow status with the network protector 36. Because the power flow is in different directions on the feeders 1 and 2, the network protector 36 determines that a fault condition exists and the reverse power flow is due to the fault condition. At about time t=17.6 s, the network protector 36 opens because the reverse power flow is on feeder 1.

Figure 8A:
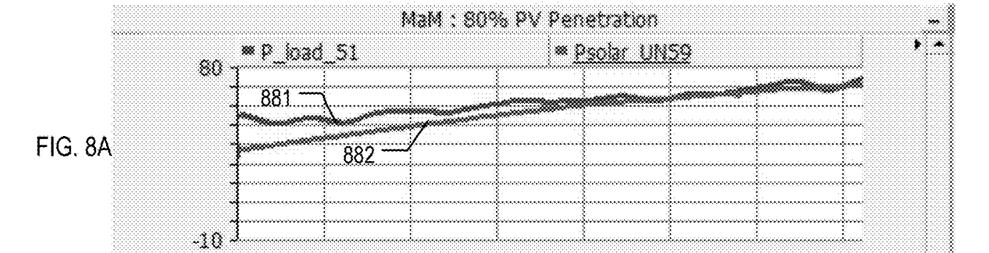
FIGS. 8A-8D show simulated data related to ordinary operating conditions in which excess energy was produced by one or more solar arrays.
Figure 8B:
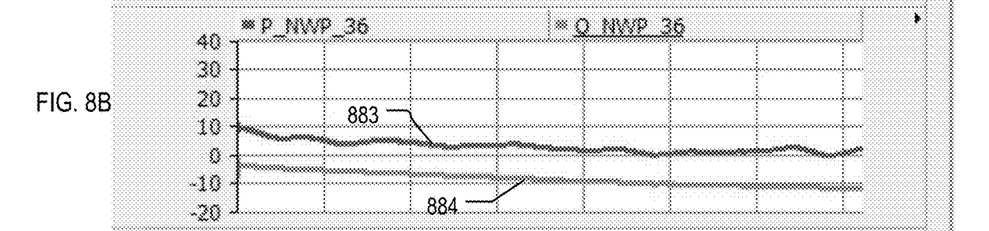
Figure 8C:
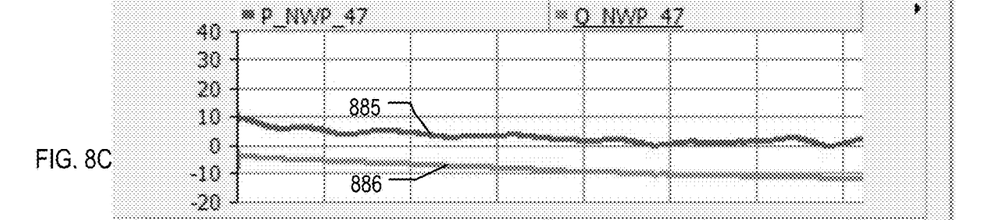
Figure 8D:
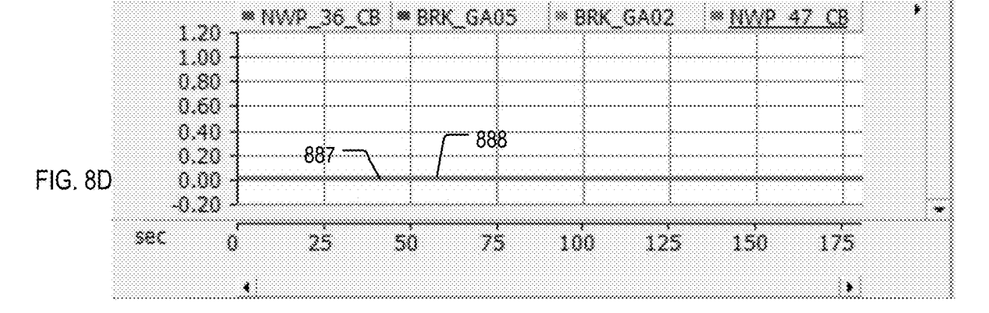

FIGS. 8A-8D show a simulation of the same spot network in a situation in which the power generated by the solar arrays exceeds the power demand of the load. FIG. 8A shows power drawn by the load (881) and power generated by the solar arrays (882) as a function of time in seconds. FIG. 8B shows power through the network protector 36 as a function of time in seconds. In FIG. 8B, real power is labeled 883 and reactive power is labeled 884. FIG. 8C shows power through the network protector 37 as a function of time in seconds. In FIG. 8C, real power is labeled 885 and reactive power is labeled 886. FIG. 8D shows the state of the network protector 36 (887) and the state of the network protector 37 (888) as a function of time. In FIG. 8D, a value of 1 on the y-axis indicated an open state and a value of 0 on the y-axis indicated a closed state. The time scale (x-axis) is the same in FIGS. 8A-8D.

As shown in FIG. 8A, from time t=0 s to around time t=100 s, the power demand of the load (881) exceeds the power generated by the solar arrays (882). Around time=100 s, the power generated by the solar arrays (882) exceeds the power demand of the load (881) intermittently. For example, the power generated by the solar arrays (882) exceeds the power demand of the load (881) at around time t=120 s. The excess power generated by the solar arrays flows as reverse power on the feeder 1 and the feeder 2. As shown in FIG. 8B and FIG. 8C, reverse power flows in the network protector 36 and the network protector 37 and the real power detected by the network protector 36 and the network protector 37 is negative (for example around time t=120 s). The network protector 36 and/or the network protector 37 performs the process 600 and determines that the reverse flow is on feeders 1 and 2. Thus, and as shown in FIG. 8D, no error condition is detected, the network protectors 36 and 37 remain closed, and the excess power from the solar arrays is returned to the grid.

These and other implementations are within the scope of the claims.

What is claimed is:

1. A network protector comprising:
a first resettable switching apparatus configured to control an electrical connection between a distribution transformer and a first electrical feeder of a secondary electrical distribution network;
a first communications interface; and
a first controller configured to:
determine a direction of power flow in the first electrical feeder;
cause the first communications interface to provide a first indication of the direction of power flow in the first electrical feeder to a second network protector; and
receive a second indication from the second network protector, wherein
the second indication comprises an indication of the direction of power flow in a second electrical feeder of the secondary electrical distribution network.

2. The network protector of claim 1, wherein the first electrical feeder and the second electrical feeder are electrically connected in parallel to an alternating current (AC) power source, and the first controller is further configured to:
determine whether the direction of power flow in the first electrical feeder is forward or reverse, wherein forward power flow is away from the power source and reverse power flow is toward the power source.

3. The network protector of claim 2, wherein the first controller is further configured to:
not open the first resettable switching apparatus if the power flow in the first electrical feeder is reverse and the power flow in the second electrical feeder is reverse; and
open the first resettable switching apparatus if the power flow in the first electrical feeder is reverse and the power flow in the second electrical feeder is forward.

4. The network protector of claim 3, wherein the first controller is configured to not open the first resettable switching apparatus if the power flow in the first electrical feeder is reverse and the power flow in the second electrical feeder is reverse at the same time.

5. The network protector of claim 1, wherein the first resettable switching apparatus comprises a circuit breaker or a vacuum interrupter.

6. The network protector of claim 1, wherein the first controller is further configured to compare the first indication to the second indication to determine whether an error condition exists.

7. The network protector of claim 6, wherein the first controller is further configured to, if an error condition exists, cause one or more of the first resettable switching apparatus and a second switching apparatus in the second network protector to open.

8. The network protector of claim 6, wherein the first controller is further configured to, if an error condition exists, determine whether the error condition is in the first electrical feeder or the second electrical feeder.

9. The network protector of claim 1, wherein the first controller is further configured to determine whether a direction of power flow is the same on the first electrical feeder and the second electrical feeder at the same time.

10. The network protector of claim 1, wherein the first electrical feeder and the second electrical feeder are configured to electrically connect to one or more distributed energy resources.

11. A system comprising:
a first network protector configured to control an electrical connection between a first distribution transformer and a first electrical feeder of a secondary electrical distribution network, the first network protector comprising:
a first communications interface; and
a first resettable switching apparatus;
a second network protector configured to control an electrical connection between second distribution transformer and a second electrical feeder of the secondary electrical distribution network, the second network protector comprising:
a second communications interface; and
a second resettable switching apparatus,
wherein the first communications interface is configured to:
provide information related to a direction of power flow in the first electrical feeder to the second communications interface, and to receive information related to a direction of power flow in the second electrical feeder from the second communications interface; and
the second communications interface is configured to:
provide information related to a direction of power flow in the second electrical feeder to the first communications interface, and to receive information related to a direction of power flow in the first electrical feeder from the first communications interface.

12. The system of claim 11, further comprising a vault, and wherein the first network protector and the second network protector are enclosed in the vault.

13. The system of claim 11, wherein the first electrical feeder and the second electrical feeder are electrically connected in parallel to a power source, and the first network protector further comprises a first controller is further configured to:
determine whether the direction of power flow in the first electrical feeder is forward or reverse, wherein forward power flow is away from the power source and reverse power flow is toward the power source.

14. The system network protector of claim 13, wherein the first controller is further configured to:
not open the first resettable switching apparatus if the power flow in the first electrical feeder is reverse and the power flow in the second electrical feeder is reverse; and
open the first resettable switching apparatus if the power flow in the first electrical feeder is reverse and the power flow in the second electrical feeder is forward.

15. The system network protector of claim 14, wherein the first controller is configured to not open the first resettable switching apparatus if the power flow in the first electrical feeder is reverse and the power flow in the second electrical feeder is reverse at the same time.

16. The system network protector of claim 13, wherein the first controller is further configured to:
not open the first resettable switching apparatus if the power flow in the first electrical feeder is reverse and the power flow in the second electrical feeder is reverse; and
open the first resettable switching apparatus if the power flow in the first electrical feeder is reverse and the power flow in the second electrical feeder is forward; and
wherein the second network protector further comprises a second controller is further configured to:
not open the second resettable switching apparatus if the power flow in the second electrical feeder is reverse and the power flow in the first electrical feeder is reverse; and
open the second resettable switching apparatus if the power flow in the second electrical feeder is reverse and the power flow in the first electrical feeder is forward.

17. The system network protector of claim 13, wherein the first electrical feeder and the second electrical feeder are configured to electrically connect to one or more distributed energy resources.

18. The system of claim 11, further comprising a communications path coupled to the first communications interface and the second communications interface.

19. The system of claim 11, further comprising a controller configured to compare the information related to a direction of power flow in the first electrical feeder to the information related to a direction of power flow in the second electrical feeder to determine whether an error condition exists.

20. The system of claim 19, wherein the controller is one or more of a controller associated with the first network protector, a controller associated with the second network protector, and a separate controller in communication with the first communications interface and the second communications interface.

* * * * *

UNITED STATES PATENT AND TRADEMARK OFFICE
CERTIFICATE OF CORRECTION

PATENT NO. : 12,418,171 B2  
APPLICATION NO. : 17/960264  
DATED : September 16, 2025  
INVENTOR(S) : Hossein Ghassempour Aghamolki et al.

Page 1 of 1

It is certified that error appears in the above-identified patent and that said Letters Patent is hereby corrected as shown below:

In the Claims

Column 14, Line 24, Claim 1: after "wherein", delete "¶"

Column 15, Line 44, Claim 14: after "system", delete "network protector"

Column 16, Line 4, Claim 15: after "system", delete "network protector"

Column 16, Line 9, Claim 16: after "system", delete "network protector"

Column 16, Line 30, Claim 17: after "system", delete "network protector"

Signed and Sealed this  
Twenty-eighth Day of October, 2025

John A. Squires  
*Director of the United States Patent and Trademark Office*